(12) United States Patent
Olson

(10) Patent No.: US 6,721,467 B2
(45) Date of Patent: Apr. 13, 2004

(54) METHOD AND APPARATUS FOR ALIGNING THE POLARIZATION OF A POLARIZATION MAINTAINING OPTICAL FIBER TO THE POLARIZATION OF A LIGHT SOURCE

(75) Inventor: Grieg A. Olson, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 116 days.

(21) Appl. No.: 09/876,401

(22) Filed: Jun. 7, 2001

(65) Prior Publication Data

US 2002/0186913 A1 Dec. 12, 2002

(51) Int. Cl.[7] .................................................. G02B 6/00
(52) U.S. Cl. ................................................ 385/11; 385/27
(58) Field of Search ........................ 385/11; 356/73.1; 250/225

(56) References Cited

U.S. PATENT DOCUMENTS

| | | |
|---|---|---|
| 4,280,765 A | 7/1981 | Pophillat et al. |
| 4,356,396 A | 10/1982 | Ruell et al. |
| 4,556,314 A | 12/1985 | Stone |
| 4,618,212 A | 10/1986 | Ludington et al. |
| 4,673,244 A | 6/1987 | Miles ........................ 350/96.2 |
| 4,787,694 A | 11/1988 | Brambley et al. |
| 4,838,032 A | 6/1989 | Maslaney et al. |
| 5,227,623 A | 7/1993 | Heffner |
| 5,245,400 A | 9/1993 | Anjan et al. ............... 356/73.1 |
| 5,298,972 A | 3/1994 | Heffner |
| 5,311,346 A | 5/1994 | Haas et al. |
| 5,359,192 A | 10/1994 | Williams et al. |
| 5,382,275 A | 1/1995 | Decao et al. |
| 5,417,733 A | 5/1995 | Wesson ........................ 65/378 |
| 5,450,508 A | 9/1995 | Decusatis et al. |

(List continued on next page.)

FOREIGN PATENT DOCUMENTS

| | | |
|---|---|---|
| DE | 198 25 876 A | 12/1999 |
| JP | 58 223032 A | 12/1983 |
| JP | 59 204738 | 11/1984 |
| JP | 62 159025 A | 7/1987 |
| JP | 01 165928 | 6/1989 |

OTHER PUBLICATIONS

Y. Ida et al., Electoncis Letters, Jan. 3rd, 1985, vol. 21, No. 1, pp. 18–20.*

Y. Ida, et al., "New Method for Polarisation Alignment of Birefringent Fibre with Laser Diode", Electronics Letters, Jan. 3rd, 1985, vol. 21, No. 1, pp. 18–20.

Olson, "Parametric Analysis of Elasto–Optic Birefringent Axis Alignment in Eccentrically Coated Polarization–Maintaining Optical Fiber", Applied Optics, Optical Society of America, Washington, vol. 31, No. 9, Mar. 20, 1992, pp. 1234–1238.

R. B. Dyott, "Elliptical Fiber Waveguides", Arttech House, Inc., Norwood, MA, Chapter 6.10.3.

Olson, "Parametric Analysis of Elasto–Optic Birefringent Axis Alignment in Eccentrically Coated Polarization–Maintaining Optical Fiber", Applied Optics, Optical Society of America, Washington, vol. 31, No. 9, Mar. 20, 1992, pp. 1234–1238.

*Primary Examiner*—Frank G. Font
*Assistant Examiner*—Michael P Mooney
(74) *Attorney, Agent, or Firm*—Gregg H. Rosenblatt; Alan Ball

(57) ABSTRACT

A method of aligning the polarization axis of a polarization maintaining optical fiber to the polarization of a light source comprising passing a well-polarized uniform beam through a polarization maintaining optical fiber; sending the beam through a polarizer; ascertaining the beam with a detector; and rotating the polarization of the beam such that the polarization output is substantially independent of wavelength.

18 Claims, 1 Drawing Sheet

U.S. PATENT DOCUMENTS

| | | |
|---|---|---|
| 5,488,683 A | 1/1996 | Michal et al. ................. 385/98 |
| 5,604,832 A | 2/1997 | Hall et al. |
| 5,623,337 A | 4/1997 | Iori et al. |
| 5,625,735 A | 4/1997 | DiMaggio et al. ............ 385/91 |
| 5,633,711 A * | 5/1997 | Nelson et al. ............... 356/318 |
| 5,686,986 A | 11/1997 | Li et al. |
| 5,717,489 A | 2/1998 | Ozeki et al. |
| 5,758,000 A | 5/1998 | Zheng ......................... 385/97 |
| 5,850,283 A | 12/1998 | Zheng |
| 5,877,493 A | 3/1999 | Richard |
| 5,965,874 A | 10/1999 | Aso et al. |
| 5,970,192 A | 10/1999 | Osugi et al. |

\* cited by examiner

METHOD AND APPARATUS FOR ALIGNING THE POLARIZATION OF A POLARIZATION MAINTAINING OPTICAL FIBER TO THE POLARIZATION OF A LIGHT SOURCE

The present invention relates to aligning an optical fiber to a light source and more particularly, to aligning a polarization maintaining optical fiber to the polarization of a light source.

BACKGROUND

In performing various measurements on polarization maintaining optical fibers and devices that use polarization-maintaining fibers it is desirable to align the polarization of the light launched into the fiber to the fiber's polarization axis. For example in the measurement of a fiber Bragg grating, the spectral center wavelength of the grating's reflection band is dependent on which polarization is launched into the fiber. Furthermore, if a conventional spectrum analyzer is used, the polarization dependence of the spectrum analyzer response may cause measurement errors. Therefore one needs to launch light into the fiber so that the polarization is aligned to the fiber axis. Fiber loop polarization controllers are often used to adjust the polarization of the light going into the grating. A conventional measurement method, as described above, requires as much as 15 minutes per fiber.

Other methods of aligning polarization axes of fibers exist, but may be unsuitable in certain applications. In particular, if the light source is a tunable laser, some of the other conventional methods will not work, due to the laser's high temporal coherence. For example, in a conventional approach, described by Miles (U.S. Pat. No. 4,673,244), a highly coherent light source can give false readings. In this approach, light is launched into the fiber and the polarization state from the fiber output is measured. The process is repeated until the output light is highly polarized, indicating that the fiber polarization axis is aligned. This method may not always work. The Miles patent states, "The birefringence of the fiber creates a remote possibility that laser light received into the fiber between the axes of propagation will emerge from the fiber as linearly polarized light." Furthermore, this method may be very time-consuming.

In another conventional method (for example Anjan, et al, U.S. Pat. No. 5,245,400), polarized light is launched into the fiber aligned to the fiber's axis and the orientation of the output end of the fiber is determined by squeezing the fiber using a mechanical transducer. While this method can locate the fiber axis at any position along the length of the fiber, it requires a priori alignment of the light source to the fiber and therefore is unsuitable for aligning the light source itself. Also, the method relies on the ability to rotate the fiber. Therefore it is not well suited for the case whether it is desirable to hold the fiber fixed and rotate the polarization of the light source.

In another conventional method, light is directed perpendicularly through the side of the fiber and the light passing through the fiber is analyzed with a computer to determine the orientation of the fiber axes. (U.S. Pat. Nos. 5,417,733; 5,488,683; 5,625,735; 5,758,000). This method is practical in fusion splicing polarization-maintaining fibers. However, the method relies on the ability to rotate the fiber. Therefore it is not well suited for the case where it is desirable to hold the fiber fixed and rotate the polarization of the light source, such as is the case when a fiber ribbon is used.

SUMMARY OF THE INVENTION

The invention is a substantial improvement over conventional methods of aligning the polarization. The conventional processes may be difficult, time consuming, inaccurate, and do not always offer proper alignment of the polarization.

Briefly, the invention includes a method and apparatus for aligning plural polarization-maintaining optical fibers with a polarized light source, using the fact that in the case of misaligned elements the output power will vary with wavelength. The subject method and apparatus involves using a polarizing filter at the output of the fibers, rotating the polarization of the light launched into the fibers, and varying the light wavelength, by computer control, until an output spectrum ripple is eliminated, as further described and illustrated.

DETAILED DESCRIPTION

Figure 1:
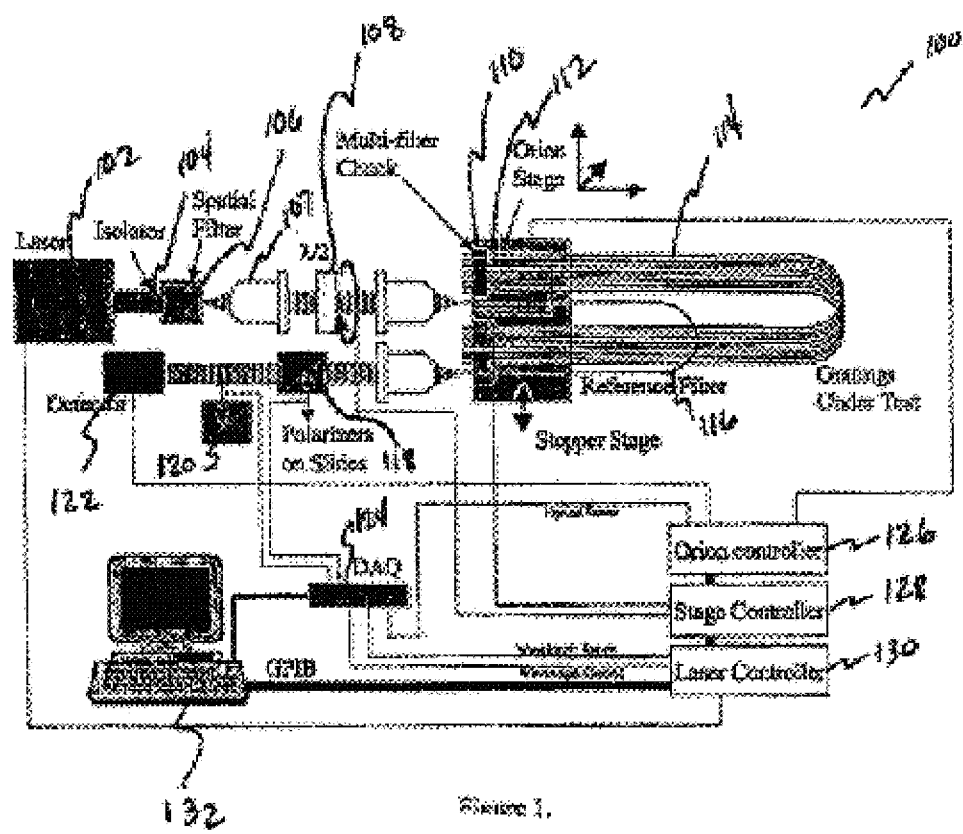
FIG. 1 depicts a schematic drawing of a test system layout with polarization control and analysis.

Referring now to the drawing, wherein like reference numbers are used to designate like elements throughout the various views. The figure is not necessarily drawn to scale, and in some instances the drawing may have been exaggerated or simplified for illustrative purposes only. One of ordinary skill in the art will appreciate the many possible applications and variations of the present invention based on the following examples of possible embodiments of the present invention.

A possible embodiment of the invention is a method and apparatus of aligning the polarization axis of a polarization maintaining optical fiber to the polarization of a wavelength-tunable light source, such as a tunable diode laser. A group of samples under test (in this case, gratings) are ribbonized at the ends, cleaved and placed in the multi-fiber chucks. The chucks sit on a translation stage that can be moved to launch light into each fiber. In this exemplary embodiment, the stage is an Orion stage, and the stage and controller are a commercial system that does a fine X-Y positional adjustment to optimize the optical power launched into the fiber. The entire system is controlled by a computing device.

The new system requires only about two minutes per fiber. Another advantage of the present invention is that it can be used with a multi-fiber measurement system. A multi-fiber holder is used with a translation stage to sequentially launch light into each fiber sequentially as shown in FIG. 1. The polarization of the laser beam is adjusted for each fiber. A fiber switch may not be useable for this because it may not ensure proper polarization launch into the fibers, even if a polarization controller is used. Other methods of polarization alignment require that the fiber be able to rotate or have other problems.

The system was constructed and a group of ten different fibers were measured a total of 78 times. The repeatability of the angular alignment had a standard deviation of 0.8E.

Another aspect of this invention is the method for measuring the ripple amplitude. One cannot simply measure the peak-to-peak values in the wavelength data, because the presence of a grating in the fiber may affect the result. If the ripple is small, the grating may dominate the peak-to-peak value of the data, causing the measurement to be wrong. However, it can be seen from Eq. 1 that the ripple is at a well-defined spatial frequency. That is, if one computes the Fourier transform of Eq. 1 there will be a strong peak in the Fourier spectrum, but a grating does not have a strong Fourier peak associated with it. Therefore one can compute the Fourier transform (or more specifically the power spectrum) of the wavelength data and measure the power associated with the Fourier peak. This will be proportional to the amplitude of the ripple.

Eq. 1 specifies not only the ripple amplitude, but also its frequency. After the power spectrum finds the ripple peak, the frequency of that peak can be used to solve Eq. 1 for the length of the fiber. Alternatively, the length of the fiber can be used to predict the ripple frequency. This can be useful, for example, to confirm that the power spectrum peak is in fact due to the ripple. It is possible for there to be additional frequency components that are due to other sources. By isolating the particular frequency of the ripple, the ripple amplitude can be found even in the midst of other signals. In the preferred embodiment, the frequency of the ripple is found when the amplitude is very high. The amplitude of the ripple can then be measured after it has been reduced in intensity.

In overview 100, FIG. 1, light from the tunable laser 102 passes through an optical isolator 104 and a spatial filter 106, at which point it is a well-polarized uniform beam. The optical isolator 104 causes the light to become polarized. For example, the polarization of the beam leaving the optical isolator might have a 55 dB extinction ratio. The spatial filter causes the polarized beam to become uniform. Note that the spatial filter might cause degradation of the polarization of the beam anywhere from negligible degradation to 30 dB or more, depending on the quality of the spatial filter lens. The beam is collimated by a strain-free microscope lens 107, and then passes through a broadband polymer half-wave plate 108. The broad-band polymer half-wave plate 108 might degrade the polarization of the beam by as much as 30 dB or more. By rotating the half-wave plate 108, the polarization of the beam can be rotated. The broad-band half-wave plate 108 is used so that its performance is substantially independent of the laser's 102 wavelength. After the light passes through the fiber 114 (or grating) under test, it is sent through a first polarizer 118 and focused onto a detector 122. Note that in alternative embodiments, the beam need not be focused onto the detector 122. For example, light may be simply directed to the detector 122, or the detector 122 may be placed in the light path. If the launch polarization is aligned to the axis, or principal state of polarization (PSP), of the fiber 114, the output polarization is independent of wavelength. If the launch polarization is not aligned to the axis of the fiber 114, the output polarization will be a function of wavelength. In this case, if a first polarizer 118 is placed in the output beam, the spectrum at the detector 122 will have a ripple as a function of wavelength. The ripple will be of the form $$r = (1-E^2)\sin(2\forall)\sin(2 2)\cos(*/2),\quad [\text{Eq. 1}]$$

where $* = 2 B L)n/8$, L is the fiber 114 length,)n is the fiber 114 birefringence, 2 is the angle of the input polarization with respect to the fiber 114 axis, $\forall$ is the angle between the output fiber 114 axis and the polarizer, and $E^2$ is the power extinction ratio of the polarizer 122. Since $\cos(*/2)$ is the only term that varies with wavelength, the ripple amplitude is given by $$A = (1-E^2)\sin(2\forall)\sin(2 2)/2 \quad [\text{Eq. 2}]$$

The angle of the fiber 114 axis is defined with respect to an arbitrary laboratory reference to be $2_0$, and let 2' be the angle of the source polarization. By the definition of 2 above, $2 = 2' - 2_0$. The orientation of the fiber 114 axis, $2_0$, is unknown. To optimize the launch polarization angle, one simply needs to measure the ripple amplitude, A, at several values of 2', and compute the value of $2_0$. Then adjust the source polarization angle to $2_0$, so that $2 = 0$ by Eq. 2. The solution does not depend on $\forall$, or on E, as long as $\forall \neq 0$ and $E \neq 1$. Inserting a polarizer 122 ensures that E is close to Zero (a typical value of E is $10^{-3}$) However, $\forall$ is uncontrolled and random. If $\forall$ is small, the ripple amplitude will be very small, and the measurement will be difficult. To solve this problem, the system includes a second polarizer, with an orientation that differs by 45E from the first polarizer 118. If the ripple amplitude is small (because • is small), the system can automatically switch to the second polarizer, ensuring that the ripple will be large.

After the polarization is aligned, the polarizer at the detector is removed to eliminate any residual polarization dependence in the spectrum that may be caused by very slight imperfections in the fiber 114 launch or in the fiber 114 itself.

Calculation of $2_0$.

Let $(1-E^2)\sin(2V)/2 = K$, so that eq. 2 becomes, $A = K\sin(2 2)$. Since 2' is controlled by a half-wave plate 108, a rotation of the wave plate 108 will cause double the rotation of the polarization. Then for a wave plate 108 angle N, $2 = 2N - 2_0$. For some initial value of $N = N_0$, $$A_1 = K\sin(4N_0 - 2 2_0).$$

Then, rotating the half-wave plate 108 by 22.5°, one has $$A_2 = K\sin(4N - 2 2_0 + 90E) = K\cos(4N - 2 2_0).$$

Then $$A_1/A_2 = \tan(4N_0 - 2 2_0).$$

Solving for $2_0$ one gets $$2_0 = 2N_0 - 0.5\arctan(\pm A_1/A_2) \quad [\text{Eq. 3}]$$

Simply measure $A_1$ and $A_2$ and compute $2_0$. $N_0$ should be chosen so that $A_1$ an $A_2$ are large enough to be easily measurable above the measurement noise.

Note that when measuring $A_1$ and $A_2$, one actually measures $|A_1|$ and $|A_2|$. Therefore there are two possible solutions to Eq. 3, and there is a "±" in the arctan term. After computing the two possible results, they must be checked to see which is correct. This is done by measuring the ripple at each angle and picking the angle with the smaller ripple.

Note that use of the polymer half-wave plate 108 is only one embodiment of the invention. Those skilled in the art will recognize that various methods of polarization rotation would work just as well. Some examples of such methods include: a) liquid crystal polarization controller, b) double Fresnel romb achromatic half-wave retarder, c) circular polarizer followed by a rotatable linear polarizer, d) zero-order half wave plate, e) achromatic polymer zero-order half wave plate, f) an electro-optic polarization retarder, such as a Pockel's Cell or Kerr Cell, f) a piezo-optic polarization retarder, or g) a combination of two or more of these devices.

The following guidelines indicate partial meanings of some terms as used herein, although none of these guidelines set forth the exclusive meaning of any term:

The term "communicably coupled" refers to any connection that is adapted to carry communication, whatever the supporting technology. It includes hard wire connections such as phone lines, T1 lines, DSL, fiber optic, etc. It also includes wireless connections adapted to carry communication such as via electromagnetic waves, wireless optics (e.g., infrared), etc. The technology by which the communication is transmitted is not material to the meaning of communicably coupled.

The term "operably coupled" refers to any connection that allows interoperability, including for example, being communicably coupled.

The term "computing device" includes a device having at least one central processing unit (CPU) and a memory device, wherein the CPU is adapted to process data that can be stored in the memory device before and/or after processing. Common examples of a computing device include personal computer, palm computing device, notebook computer, server, or mainframe. Also included within the definition of computing device is a system of multiple computers networked together such that processing and/or storage activities on the computers are coordinated. Also included in the definition of computing device is a system of devices networked together such that each device may not be a computer in its own right, but in combination, the networked devices achieve the functionality of a computer having at least one CPU and at least one memory device. For example, components of a computing device may be connected across the Internet.

The term "non-volatile storage" includes storage devices whose contents are preserved when their power is off. These devices are often used as secondary storage devices. Storage using magnetic media (e.g. magnetic disks, magnetic tape or bubble memory) is normally non-volatile by nature. Other examples of non-volatile storage include Bernoulli Box (trademark of Iomega Corporation), compact disc (CD), computer output on microfilm (COM), computer output on laser disk (COLD), digital audio tape (DAT), digital linear tape (DLT), digital versatile disk (DVD), electrically alterable programmable read-only memory (EAPROM), electrically erasable programmable read-only memory (EEPROM), erasable programmable read-only memory (EPROM), flash erasable programmable read-only memory (FEPROM), floppy disk, floptical, hard disk (removable or fixed), Jaz Drive (trademark of Iomega Corporation), JBOD, disk farm, magnetic disk, magnetic drum, optical disk, magneto-optical disk, one time programmable read-only memory (OTPROM or OTP), programmable read-only memory (PROM), tape drive, paper tape, and punch cards.

The term "volatile storage" includes storage devices whose contents are not ordinarily preserved when their power is off. Examples of volatile memory include semiconductor memories (static RAM and especially dynamic RAM), which are normally volatile but can be made into non-volatile storage by having a (rechargeable) battery or other uninterrupted power supply permanently connected. Dynamic RAM is particularly volatile since it loses its data, even if the power is still on, unless it is refreshed. An acoustic delay line is a (very old) example of a volatile storage device.

The term "memory device" includes all data storage devices, including nonvolatile, volatile, and other data storage devices.

The term "well-polarized" is a relative term. In the preferred embodiment, it might mean an extinction ratio of at least 15 dB. However, this is not meant to be a cutoff level below which an embodiment of the invention cannot function because the term is a relative term.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provision of 35 U.S.C. §112, ¶6.

It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A method of aligning the polarization axis of a polarization maintaining optical fiber to the polarization of a light source comprising:
   (a) passing a well-polarized uniform beam through a broad-band polarization rotation device;
   (b) after passing the well-polarized uniform beam through the broad-band polarization rotation device, passing the well-polarized uniform beam through a polarization maintaining optical fiber;
   (c) sending the beam through a first polarizer;
   (d) ascertaining the beam with a detector, the ascertaining the beam to include detection of a ripple amplitude that is transformable to a larger ripple amplitude by sending the beam through a second polarizer, located between the first polarizer and the detector, wherein the second polarizer differs from the first polarizer by a substantial angle; and
   (e) rotating the polarization of the beam with the broad-band polarization rotation device such that the polarization output is substantially independent of wavelength.

2. The method of claim 1, further comprising:
   (a) before passing the well-polarized uniform beam through the polarization maintaining optical fiber, collimating the well-polarized uniform beam.

3. The method of claim 2, wherein collimating the well-polarized uniform beam comprises:
   (a) collimating the well-polarized uniform beam with a strain-free microscope lens.

4. The method of claim 3, further comprising:
   (a) before collimating the well-polarized uniform beam with the strain-free microscope lens, passing light through an optical isolator and a spatial filter, whereby the light becomes the well-polarized uniform beam.

5. The method of claim 4, wherein passing light through the optical isolator and the spatial filter, whereby the light becomes the well-polarized uniform beam comprises:
   (a) passing light from a wavelength-tunable laser through the optical isolator and the spatial filter, whereby the light becomes the well-polarized uniform beam.

6. The method of claim 5,
   (a) further comprising:
      (i) before passing the well-polarized uniform beam through the polarization maintaining optical fiber, passing the well-polarized uniform beam through a broad-band polarization rotation device; and
   (b) wherein rotating the polarization of the beam such that the polarization output is substantially independent of wavelength comprises:
      (i) rotating the polarization of the beam with the broad-band polarization rotation device such that the polarization output is substantially independent of wavelength.

7. The method of claim 6, wherein the broad-band polarization rotation device comprises a broad-band polymer half-wave plate.

8. The method of claim 6, wherein detection of the ripple amplitude comprises:
(a) computing the power spectrum of the wavelength data; and
(b) measuring the power associated with the Fourier peak, whereby the power associated with the Fourier peak will be proportional to the amplitude of the ripple.

9. The method of claim 6, wherein the substantial angle is about 45°.

10. The method of claim 9, further comprising adjusting the X-Y positional relationship between the fiber and the beam, wherein optical power launched into the fiber is optimized.

11. An apparatus for aligning the polarization axis of a polarization maintaining optical fiber to the polarization of a light source comprising:
(a) a polarization maintaining optical fiber having a first end and a second end;
(b) a broad-band polarization rotation device having a first end and a second end,
  (i) the second end of the broad-band polarization rotation device being operably coupled to the first end of the fiber;
  (ii) wherein the broad-band polarization rotation device is adapted to rotate the polarization of a well-polarized uniform beam passed into the first end of the broad-band polarization rotation device and out of the second end of the broad-band polarization rotation device; and
  (iii) wherein the rotation is such that the polarization output is substantially independent of wavelength;
(c) a polarizer operably coupled to the second end of the fiber, wherein the polarizer comprises:
  (i) a first polarizer;
  (ii) a second polarizer, wherein the second polarizer differs from the first polarizer by a substantial angle; and
(d) a detector operably coupled to the polarizer, wherein the detector is adapted to measure ripple amplitude of the beam made larger due to the substantial angle of difference between the first polarizer and the second polarizer.

12. The apparatus of claim 11, wherein the detector is adapted to measure the ripple amplitude by
(a) computing the power spectrum of the wavelength data; and
(b) measuring the power associated with the Fourier peak, whereby the power associated with the Fourier peak will be proportional to the amplitude of the ripple.

13. The apparatus of claim 11, wherein the second polarizer differs from the first polarizer by about 45°.

14. The apparatus of claim 13, wherein the broad-band polarization rotation device comprises a broad-band polymer half-wave plate.

15. The apparatus of claim 14, further comprising:
(a) a strain-free microscope lens,
  (i) operably coupled to the first end of the broad-band polarization rotation device; and
  (ii) wherein the lens is adapted to collimate the well-polarized uniform beam passing through the lens and into the first end of the broad-band polarization rotation device.

16. The apparatus of claim 15, further comprising:
(a) a spatial filter, operably coupled to the lens;
(b) an optical isolator, operably coupled to the spatial filter; and
(c) wherein the spatial filter and the optical isolator are adapted to cause entering light to become the well-polarized uniform beam upon passing through the spatial filter and the optical isolator toward the lens.

17. The apparatus of claim 16, further comprising:
(a) a wavelength-tunable laser operably coupled to the optical isolator, wherein the laser sends light into the optical isolator.

18. The apparatus of claim 17, further comprising:
(a) a computing device operably coupled
  (i) to the first end of the fiber; and
  (ii) to the detector;
(b) wherein the computing device is adapted to adjust the X-Y position of the first end of the fiber such that optical power launched into the fiber is optimized.

* * * * *

UNITED STATES PATENT AND TRADEMARK OFFICE
CERTIFICATE OF CORRECTION

PATENT NO. : 6,721,467 B2
DATED : April 13, 2004
INVENTOR(S) : Olsen, Greig A.

It is certified that error appears in the above-identified patent and that said Letters Patent is hereby corrected as shown below:

Column 4,
Line 6, after "$10^{-3}$)" insert -- . --.
Line 11, delete "•" and insert -- $\forall$ -- therefor.
Line 21, delete "(2V)" and insert -- ($2\forall$) -- therefor.

Signed and Sealed this

Twenty-seventh Day of July, 2004

JON W. DUDAS
*Acting Director of the United States Patent and Trademark Office*